United States Patent [19]
Miyamae

[11] 3,903,634
[45] Sept. 9, 1975

[54] FISHING ROD SUPPORTING MEANS

[76] Inventor: Toshiaki Miyamae, 16,2-ban, 2-chome, Nishi-Iwata, Higashi-Osaka, Osaka, Japan

[22] Filed: Aug. 30, 1973

[21] Appl. No.: 393,061

[30] Foreign Application Priority Data
Dec. 14, 1972 Japan............................ 47-143787
Jan. 9, 1973 Japan................................ 48-6012

[52] U.S. Cl. ............................................... 43/21.2
[51] Int. Cl.² ......................................... A01K 97/10
[58] Field of Search .................. 43/21.2, 15, 16, 17; 248/38, 40

[56] References Cited
UNITED STATES PATENTS
3,031,048  4/1962  Katter................................ 43/21.2
3,655,155  4/1972  Taylor................................ 43/21.2

Primary Examiner—Warner H. Camp
Attorney, Agent, or Firm—Toren, McGeady and Stanger

[57] ABSTRACT

In a fishing rod supporting member adapted to be detachably mounted on a fishing rod and to support the same stably when the fishing rod is placed on a boat, the member includes an L shaped bracket including a central station having a circular arc shaped recess portion, a pair of stud bolts erected at both sides thereof and an outwardly curved plate member having holes for receiving the stud bolts for tightly holding the fishing rod within the space defined between the recess portion and the curved plate member by screwing tightening means onto the stud bolts.

Further forming the central station into an inverted V-shape and mounting a fishing line guide pin in the space defined in the cone shaped central station.

1 Claim, 3 Drawing Figures

PATENTED SEP 9 1975     3,903,634

FISHING ROD SUPPORTING MEANS

The present invention relates generally to a means for supporting a fishing rod usable for enjoying fishing by dropping a fishing line through the rod into the sea from a fishing boat, and more particularly it relates to a means designed to be detachably fixed about the centroid of a fishing rod so as to permit the fishing rod to be stably supported on any edge of the gunwale of the boat in any desired direction.

In order to enjoy offshore fishing by boat it is customary with fishermen to drop a fishing line deep in the sea from the foremost end of a fishing rod. For this purpose, fishermen must for a long while hold the grip portion of the fishing rod from which a long length of fishing line is extended into the sea. Thus such an arrangement is, more often than not, physically and psychologically tiring due to the long wait for a fish to be caught while grasping the fishing rod with one hand in a seated or standing posture so that, as a matter of course, they generally put the fishing rod on the most accessible edge of the gunwale of the boat until a fish takes the bait. In this case, however, the boat is always rolling or pitching on the sea and the fishing rod unstably placed on the edge is easily moved along the edge and often falls onto the sea surface.

The present invention has been designed to eliminate the abovementioned drawbacks and disadvantages, having as one of its main objects the provision of a fishing rod supporting means capable of stably holding a fishing rod in position for example, on the edge of the gunwale of a fishing boat.

It is another object of the invention to provide a fishing rod supporting means that can be detachably mounted on any suitable portion of a fishing rod.

It is a further object of the invention to provide a structurally simplified fishing rod supporting means that can be easily mounted on a fishing rod and economically produced.

These and other objects, features and advantages of the present invention will become apparent from the following detailed description when taken in conjunction with the accompanying drawing, in which.

Figure 1:
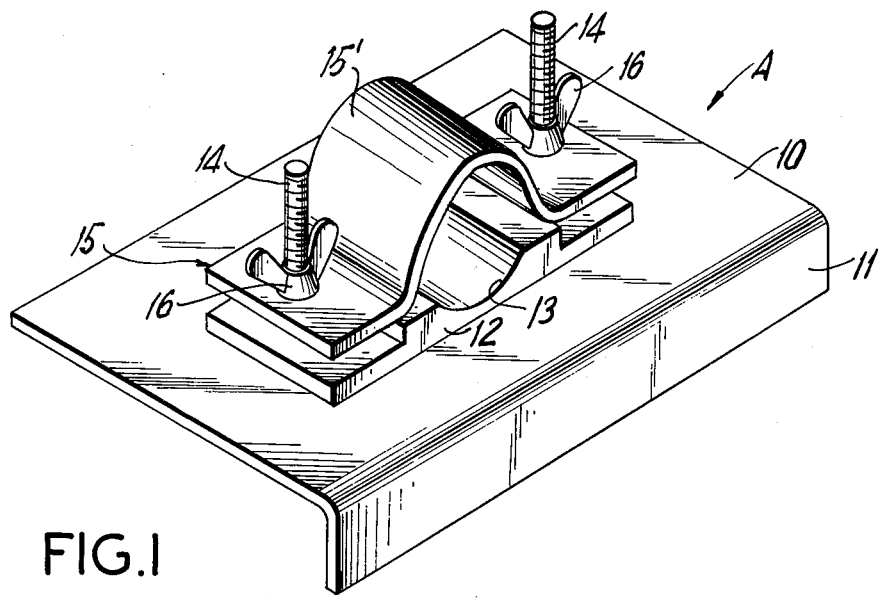
FIG. 1 is a perspective view of a fishing rod supporting means embodied in accordance with the present invention.

Referring now to the accompanying drawings, and first more particularly to FIG. 1, reference numeral 10 designates a bracket made of a light and hard metal or synthetic resin material. The bracket 10 has one side wall 11 extended integrally therefrom and bent at a right angle therewith so as to form a substantially L shape in cross section. The bracket 10 is provided in its middle portion with a central station 12 which has a central downwardly curved recessed portion 13 formed in a circular arc shape for receiving the outer peripheral portion of a fishing rod B. On both sides of the central station 12 there are formed a pair of blind holes (not shown in the drawing) so that stud bolts 14 are screwably inserted into the holes in rigidly fixed relation to the central station 12. In this case, it is preferable that a metallic or synthetic resin washer or a tightening nut is forcibly screwed to each bolt 14 until it abuts the outer surface of the central station 12 surrounding each hole so as to help the fishing rod B be held in adjusted position of the fishing rod supporting means A for the reason that will be described hereinafter.

Numeral 15 denotes a fishing rod holding plate or clip adapted to adjustably hold a designed portion of the fishing rod B. Similarly to the central station 12, the plate or clip 15 is provided in its middle portion with a circular arc 15' which is outwardly or upwardly curved in cross section. The plate or clip 15 has also a pair of holes (not shown) which correspond to the holes of central station 12 and are substantially a little greater in diameter than the outer diameter of the stud bolts 14 and the latter holes of the central station 12 whereby said plate or clip 15 can be adjustably moved in vertical direction on the pair of stud bolts 14 with respect to the central station 12, thus any diameter end portion on any kind of fishing rod B can be held between the clip 15 and the recessed portion 13 of the central station 12.

The fishing rod supporting means A thus formed in accordance with the present invention is fixedly mounted on any suitable portion of the fishing rod B by inserting the means A onto the latter portion through the substantially circular shaped space in cross section formed between the circular arc shaped recessed portion 13 of the central station 12 and the outwardly curved or circular arc 15' of the fishing rod holding plate 15, and by screwably tightening a thumb nut 16 onto the stud bolts 14 so as to fixedly hold the fishing rod B within the space.

As has been mentioned, the fishing rod supporting means A of the present invention is mounted in or near the centroid of the fishing rod B and designed to be placed on the gunwale the width of whose upper edge is generally greater than that of the bracket 10 on which the main body of the fishing rod supporting means A is located so that the fishing rod B can be supported more stably in the balancing range provided by the width of the upper edge than on the bracket 10 per se.

Furthermore, the vertically downward side wall 11 of the bracket 10 is normally placed in contact with the inner side wall of the gunwale so that it serves to keep the fishing rod B stable against the jerking force of the fishing line D caused when a fish takes the bait.

Besides, the above-mentioned reasons, it is easily understood that when the fishing rod supporting means A of the present invention is applied to the fishing rod B, the fishing rod can always be kept stable on the upper edge of the gunwale without being subjected to the rolling and pitching motions of the fishing boat C just like a balancing toy whose center of gravity is supported on a lever fulcrum in a manner to balance itself by swaying vertically and laterally subject to such external motions.

Figure 3:
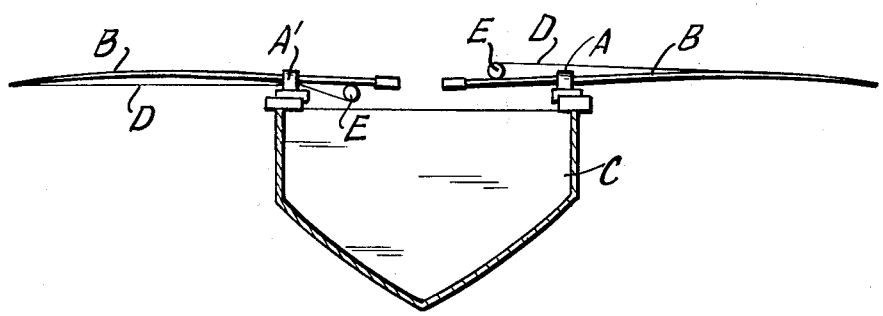
FIG. 3 is a schematic diagram showing how the fishing rod supporting means of the invention are applicable to a fishing boat.

In the foregoing embodiment of the invention, reference has been made only to the fishing rod supporting means A of a type that it is applicable to the fishing rod B with respect to which a fishing reel E is upwardly mounted as is definitely shown on the right hand side of the fishing boat C in FIG. 3.

According to the present invention, however, it is also possible to provide a fishing rod supporting means A' in the form of another embodiment, of a type that it can be applied to the fishing rod B with respect to which the fishing reel E is downwardly mounted as is also definitely shown on the left hand side of the fishing boat C in FIG. 3.

Figure 2:
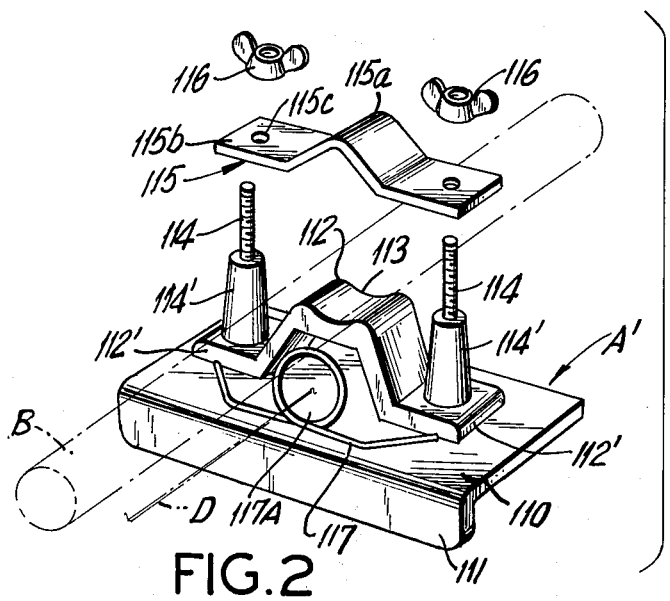
FIG. 2 is a partially exploded perspective view showing another embodiment of the invention.

Thus now referring especially to FIG. 2 illustrating the fishing rod supporting means A' in the form of another embodiment of the invention, reference numeral 110 designates a bracket made of a light and hard metal or synthetic resin material. Similarly to the bracket 10 of the foregoing embodiment, the bracket 110 has one side wall 111 extended integrally therefrom and bent at a right angle therewith so as to form a substantially L shape in cross section. The bracket 110 is provided in its middle portion with a central station 112 having a cross-sectioned configuration of a trapezoid whose base extends outwardly to form a pair of lateral legs 112' rigidly fixed to the outer surface of the bracket 110.

The upside of the trapezoid central station 112 is downwardly curved to form a circular arc shaped recess portion 113 which receives the outer peripheral portion of the fishing rod B. Each of said lateral legs 112' is bored with a threaded hole (not shown) into which a stud bolt 114 is screwably forced in erected relation with the legs 112'.

On each stud bolt 114 is screwed a suitable nut or a washer 114' having its length substantially equal to the height of said trapezoid central station 112 for the reason that will be described later.

Reference numeral 115 denotes a fishing rod holding plate formed with an inverted V-shaped member 115a and a pair of lateral legs 115b laterally extending from both sides thereof. Each of the lateral legs 115b is bored with a through hole 115c in the position wherein the stud bolt 114 can be freely inserted therethrough.

The fishing rod supporting means A' thus formed in accordance with the present embodiment is mounted on the fishing rod B by rigidly fixing the rod between the circular arc shaped recess portion 113 of the trapezoid central station 112 and the inverted V-shaped member 115a of the fishing rod holding plate 115, thereafter screwing the thumb nut 116 onto the stud bolts 114 inserted into the through holes 115c, and screwably tightening the thumb nuts 116 against the nuts or washers 114'. Incidentally, the fishing rod holding plate 115 may be formed into such a circular arc shape that the fishing rod B can be effectively held between the such circular arc and the recess portion 113. In order to help the fishing line D run to and from the fishing reel E, a fishing line guide pin 117 is mounted on the lateral legs 112' of the central station 112. Said guide pin 117 has a line insertion eye 117a positioned in the space defined in the trapezoid central station 112.

While but a few preferred embodiments of the invention have been particularly shown and described, it is distinctly understood that the present invention, illustrated and described in detail in the drawing and foregoing description, is to be considered as illustrative in character, and that all changes and modifications that come within the spirit of the present invention are included.

What is claimed is:

1. A fishing rod supporting means, detachably mounted on a fishing rod, for supporting the rod in a stable manner on a fishing boat in the vertical and lateral directions, said supporting means comprising a bracket having an L-shaped cross-section, a central station fixedly mounted intermediate said bracket and provided in the middle portion thereof with a downwardly curved recessed portion and a pair of blind holes bored at both sides of said recessed portion, a pair of stud bolts fixedly inserted in said holes in vertical relation to said central station, a plate having an upwardly curved portion and a pair of through holes bored in positions corresponding to said blind holes so as to permit such stud bolts to pass therethrough, tightening means screwable to each of said stud bolts for adjustably mounting the fishing rod between said downwardly curved recessed portion of the central station and the upwardly curved portion of the plate, said plate having the upwardly curved portion formed in a substantially inverted V-shape, said middle portion of said central station being elevated above said bracket so as to receive therein a guide pin for guiding a fishing line to and from a fishing line reel mounted on the fishing rod.

* * * * *